United States Patent
Yu et al.

(10) Patent No.: US 9,453,783 B2
(45) Date of Patent: Sep. 27, 2016

(54) METHOD AND APPARATUS FOR DETECTING MISFIRE OF ENGINE

(71) Applicants: Hyundai Motor Company, Seoul (KR); Kia Motors Corporation, Seoul (KR)

(72) Inventors: Seungeun Yu, Seoul (KR); Kihoon Nam, Gunpo-si (KR); Kyoungchan Han, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 218 days.

(21) Appl. No.: 14/276,794

(22) Filed: May 13, 2014

(65) Prior Publication Data

US 2015/0143883 A1    May 28, 2015

(30) Foreign Application Priority Data

Nov. 22, 2013  (KR) .......................... 10-2013-0143266

(51) Int. Cl.
    *G01M 15/11*    (2006.01)
(52) U.S. Cl.
    CPC .................................... *G01M 15/11* (2013.01)
(58) Field of Classification Search
    CPC .................................................... G01M 15/11
    USPC ................ 73/114.02, 114.03, 114.04, 114.05
    See application file for complete search history.

(56) References Cited

U.S. PATENT DOCUMENTS

| | | | | |
|---|---|---|---|---|
| 5,327,090 A * | 7/1994 | Shimasaki | ............... | F02P 17/12 123/644 |
| 5,327,867 A * | 7/1994 | Hisaki | ...................... | F02P 11/00 123/406.14 |
| 5,447,061 A * | 9/1995 | Fujiki | .................... | G01M 15/11 701/110 |
| 5,499,536 A * | 3/1996 | Wier | ....................... | G01M 15/11 701/111 |
| 5,808,186 A * | 9/1998 | Matsumoto | ......... | F02D 41/1498 73/114.03 |
| 5,906,651 A * | 5/1999 | Amano | ................... | G01M 15/11 123/436 |
| 5,954,784 A * | 9/1999 | Inada | .................... | F02D 41/009 123/436 |
| 7,155,965 B2 * | 1/2007 | Kim | ........................ | G01M 15/11 73/114.03 |
| 2002/0134357 A1 * | 9/2002 | White | .................. | F02D 41/0087 123/481 |

FOREIGN PATENT DOCUMENTS

| | | |
|---|---|---|
| JP | 06-123251 A | 5/1994 |
| JP | 2003-184635 A | 7/2003 |
| KR | 10-0140685 B1 | 3/1998 |

* cited by examiner

*Primary Examiner* — Eric S McCall

(74) *Attorney, Agent, or Firm* — Morgan, Lewis & Bockius LLP

(57) ABSTRACT

A method and an apparatus for detecting engine misfire has advantages of precisely detecting misfire occurrence when misfire continuously occurs at three or more engine cylinders and detecting an engine cylinder where the misfire occurs. The method may include calculating an angular acceleration factor value on the basis of an engine speed, calculating a variation value of an angular acceleration factor on the basis of the angular acceleration factor value, calculating a threshold point of misfire starting and a threshold point of misfire ending, comparing the variation value of the angular acceleration factor with the threshold point of misfire starting, comparing the variation value of the angular acceleration factor with the threshold point of misfire ending, and detecting a cylinder of the engine where the misfire occurs by the comparison results.

14 Claims, 3 Drawing Sheets

METHOD AND APPARATUS FOR DETECTING MISFIRE OF ENGINE

CROSS-REFERENCE TO RELATED APPLICATION

The present application claims priority of Korean Patent Application Number 10-2013-0143266 filed on Nov. 22, 2013, the entire contents of which application are incorporated herein for all purposes by this reference.

BACKGROUND OF INVENTION

1. Field of Invention

The present invention relates to a method and an apparatus for detecting misfire of an engine for a vehicle. More particularly, the present invention relates to a method and an apparatus of detecting precisely whether each of engine cylinders has a misfire or not when the engine cylinders have continuous misfires.

2. Description of Related Art

Generally, power loss, increase of fuel consumption, and vibration of an engine occur when a misfire occurs in the engine of a vehicle instead of normal combustion. The engine has a problem with not only power loss but also overall damage because unburned combustion gas causes a post-explosion in the exhaust manifold. Moreover, environmental pollution is increased because a lot harmful exhaust gas is produced.

In order to prevent this phenomenon, a method of detecting misfire of the engine that detects a cylinder of the engine and restores the engine when misfire occurs in the engine has been studied. A traditional method and an apparatus calculate an angular speed of a crankshaft corresponding to the cylinder of the engine and detect misfire of the engine according to a variation amount or a variation rate of the angular speed.

The traditional method and apparatus can only detect misfire of one or two engine cylinders, such that it cannot detect misfire of three or more engine cylinders.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a method and an apparatus for detecting misfire of an engine for a vehicle having advantages of precisely detecting misfire occurrence when a misfire continuously occurs in three or more engine cylinders and detecting an engine cylinder where the misfire occurs.

Various aspects of the present invention provides a method of detecting misfire of an engine for a vehicle that may include calculating an angular acceleration factor value on the basis of an engine speed, calculating a variation value of an angular acceleration factor on the basis of the angular acceleration factor value, calculating a threshold point of misfire starting and a threshold point of misfire ending, comparing the variation value of the angular acceleration factor with the threshold point of misfire starting, comparing the variation value of the angular acceleration factor with the threshold point of misfire ending, and detecting a cylinder of the engine where the misfire occurs by the comparison results.

The calculation of the angular acceleration factor value on the basis of the engine speed may be performed by calculating an angular acceleration of a crank angle and considering a time per segment and an average variation of the engine speed.

The threshold point of misfire starting and the threshold point of misfire ending may be determined by the engine speed and a running state of the vehicle according to a fuel injection amount, and may be corrected by receiving a coolant temperature, a combustion mode, a starting condition, and a clutch operation.

The comparison of the variation value of the angular acceleration factor with the threshold point of misfire starting may include correlating an engine cylinder number with a segment number when a corresponding engine cylinder finishes an explosion stroke, and determining occurrence of misfire and recording the segment number when the variation value of the angular acceleration factor is greater than the threshold point of misfire starting.

It may be determined that the misfire ends when the variation value of the angular acceleration factor is lower than the threshold point of misfire ending, and a segment number may be recorded in the comparing of the variation value of the angular acceleration factor with the threshold point of misfire ending.

In the detecting of a cylinder of the engine where the misfire occurs by the comparison results, it may be determined that the misfire occurs in all the engine cylinders from an engine cylinder where the variation value of the angular acceleration factor is greater than the threshold point of misfire starting to an engine cylinder where the variation value of the angular acceleration factor is lower than the threshold point of misfire ending.

Various other aspects of the present invention provide an apparatus for detecting misfire of an engine for a vehicle, which may include a running state detecting unit configured to recognize a running state of the vehicle, a threshold point calculating unit configured to calculate a threshold point of misfire starting and a threshold point of misfire ending, a misfire determining unit configured to determine a misfire on the basis of signals output from the running state detecting unit and the threshold point calculating unit, and a displaying unit configured to display a misfire occurrence of an engine cylinder to a driver.

The running state detecting unit may include an engine speed detecting unit configured to detect an engine speed, a fuel injection amount detecting unit configured to measure an amount of fuel injected to an engine cylinder, a coolant temperature detecting unit configured to measure a coolant temperature, a combustion mode detecting unit configured to detect a predetermined combustion mode, a starting condition detecting unit configured to detect a starting condition, and a clutch operation detecting unit configured to detect a clutch operation.

The threshold point calculating unit may correct a threshold point depending on the running state of the vehicle detected from the running state detecting unit.

The misfire determining unit may determine the misfire occurrence of the engine cylinder by comparing a variation value of an angular acceleration factor with a threshold point calculated by the threshold point calculating unit.

The misfire determining unit may determine that misfire occurs when the variation value of the angular acceleration factor is greater than a threshold point of misfire starting and that misfire ends when the variation value of the angular acceleration factor is lower than a threshold point of misfire ending, and that misfire occurs in all the engine cylinders from an engine cylinder which performs an explosion stroke at the time of misfire starting to an engine cylinder which performs the explosion stroke just before the time of misfire ending.

According to an exemplary embodiment of the present invention as stated above, the method and the apparatus may precisely detect misfire occurrence when misfire continuously occurs at three or more engine cylinders, and may detect the engine cylinder where the misfire occurs by correlating the engine cylinder number with the segment number corresponding to the engine cylinder. Thus, the engine in which occurs misfire may be quickly restored its original state.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
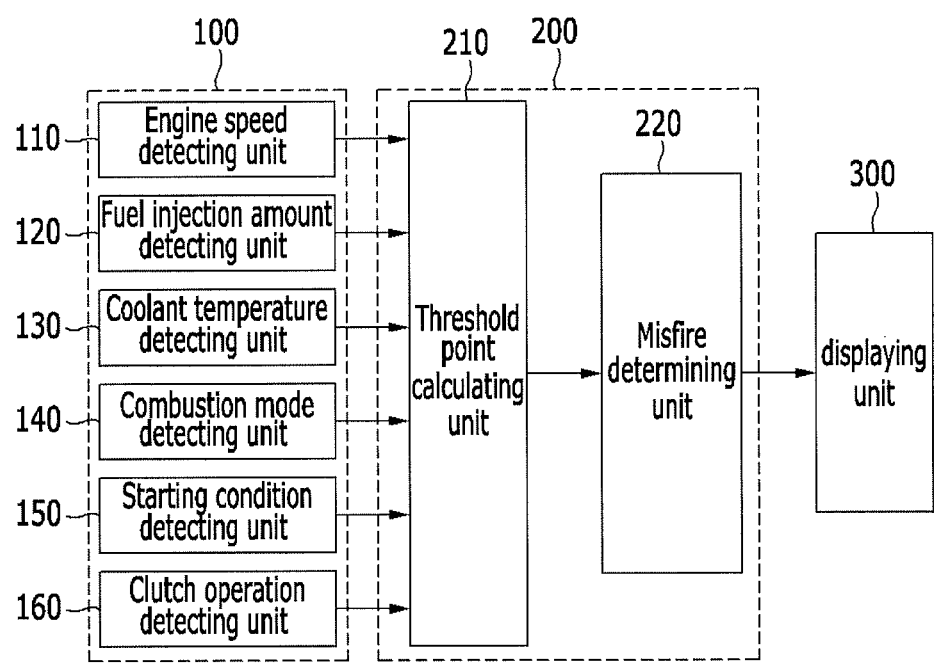
FIG. 1 is a block diagram of an exemplary misfire detecting apparatus of an engine according to the present invention.

FIG. 1 is a block diagram of a misfire detecting apparatus of an engine according to various embodiments of the present invention. The misfire detecting apparatus includes a running state detecting unit 100, a controlling unit 200, and a displaying unit 300.

The running state detecting unit 100 detects data for detecting misfire of the engine. The running state detecting unit 100 includes an engine speed detecting unit 110, a fuel injection amount detecting unit 120, a coolant temperature detecting unit 130, a combustion mode detecting unit 140, a starting condition detecting unit 150, and a clutch operation detecting unit 160.

The engine speed detecting unit 110 may detect a changing engine speed according to a running state of the vehicle. The engine speed detecting unit 110 may be a crankshaft angular sensor or a camshaft angular sensor, but it is not limited thereto.

The fuel injection amount detecting unit 120 may measure a changing amount of fuel injected into an engine cylinder according to an operating state of the engine. Generally, an engine control unit (ECU) determines a fuel amount injected into an engine cylinder according to the operating state of the engine. Therefore, in this specification and the scope of the appended claims, the fuel injection amount detecting unit 120 should be understood to be all of means that can measure or confirm the amount of fuel injected into an engine cylinder.

The coolant temperature detecting unit 130 may detect a changing temperature of coolant according to the operating state of the engine.

The combustion mode detecting unit 140 may detect a changing combustion mode according to the operating state of the engine. For example, the combustion mode is a main injection mode, a mode in which main injection and pilot injection occur once, or a mode in which main injection and pilot injection occur twice or more, but it is not limited thereto.

The starting condition detecting unit 150 may detect a starting condition in which a fuel amount for preventing poor starting or starting delay is controlled according to the operating state of the engine.

The clutch operation detecting unit 160 may detect a clutch operation that connects or disconnects power delivery of the engine to a transmission.

As described, the running state detecting unit 100 outputs a detecting signal which signifies the running state of the vehicle, and the output signal is transmitted to a threshold point calculating unit 210 of the controlling unit 200. The controlling unit 200 which includes the threshold point calculating unit 210 and a misfire determining unit 220 may be installed in an ECU.

The threshold point calculating unit 210 may calculate a threshold point of misfire occurrence by using the engine speed detected by the engine speed detecting unit 110 and the fuel injection amount detected by the fuel injection amount detecting unit 120. In this context, the threshold point of misfire occurrence may include a threshold point of misfire starting and a threshold point of misfire ending. Moreover, the threshold point calculating unit 210 may correct a threshold point by using data detected by the coolant temperature detecting unit 130, the combustion mode detecting unit 140, the starting condition detecting unit 150, and the clutch operation detecting unit 160. Therefore, the threshold point calculating unit 210 may finally calculate the threshold point of misfire starting and the threshold point of misfire ending by correcting the threshold point.

The misfire determining unit 220 determines the misfire occurrence of the engine cylinder based on the threshold point of misfire calculated by the threshold point calculating unit 210. That is, the misfire determining unit 220 determines that misfire occurs in all the engine cylinders from an engine cylinder which undergoes an explosion stroke at the time of misfire starting to an engine cylinder which undergoes the explosion stroke just before the time of misfire ending. For example, a time point of misfire starting may be the point of time that a variation value of an angular acceleration factor is greater than the threshold point of misfire starting, and a time point of misfire ending may be the point of time that the variation value of the angular acceleration factor is lower than the threshold point of misfire ending.

In addition, the misfire determining unit 220 determines the misfire occurrence of the engine cylinder by correlating an explosion sequence stored in the ECU, and may output a predetermined control signal at the time point of misfire starting and/or ending.

As described, the controlling unit 200 which include the threshold point calculating unit 210 and the misfire determining unit 220 calculates the threshold point of misfire occurrence and determines the misfire occurrence of the engine cylinder based on the threshold point of misfire occurrence. Thus, the controlling unit 200 may rapidly restore the engine to its original state. To this end, the controlling unit 200 may be implemented as at least one processor that is operated by a predetermined program, and the predetermined program may be programmed in order to perform each step of a method of detecting misfire of the engine for the vehicle according to an exemplary embodiment of the present invention.

The displaying unit 300 turns on an engine warning lamp in order to notify misfire occurrence of the engine to a driver by inputting the predetermined control signal output from the misfire determining unit 220.

Figure 2:
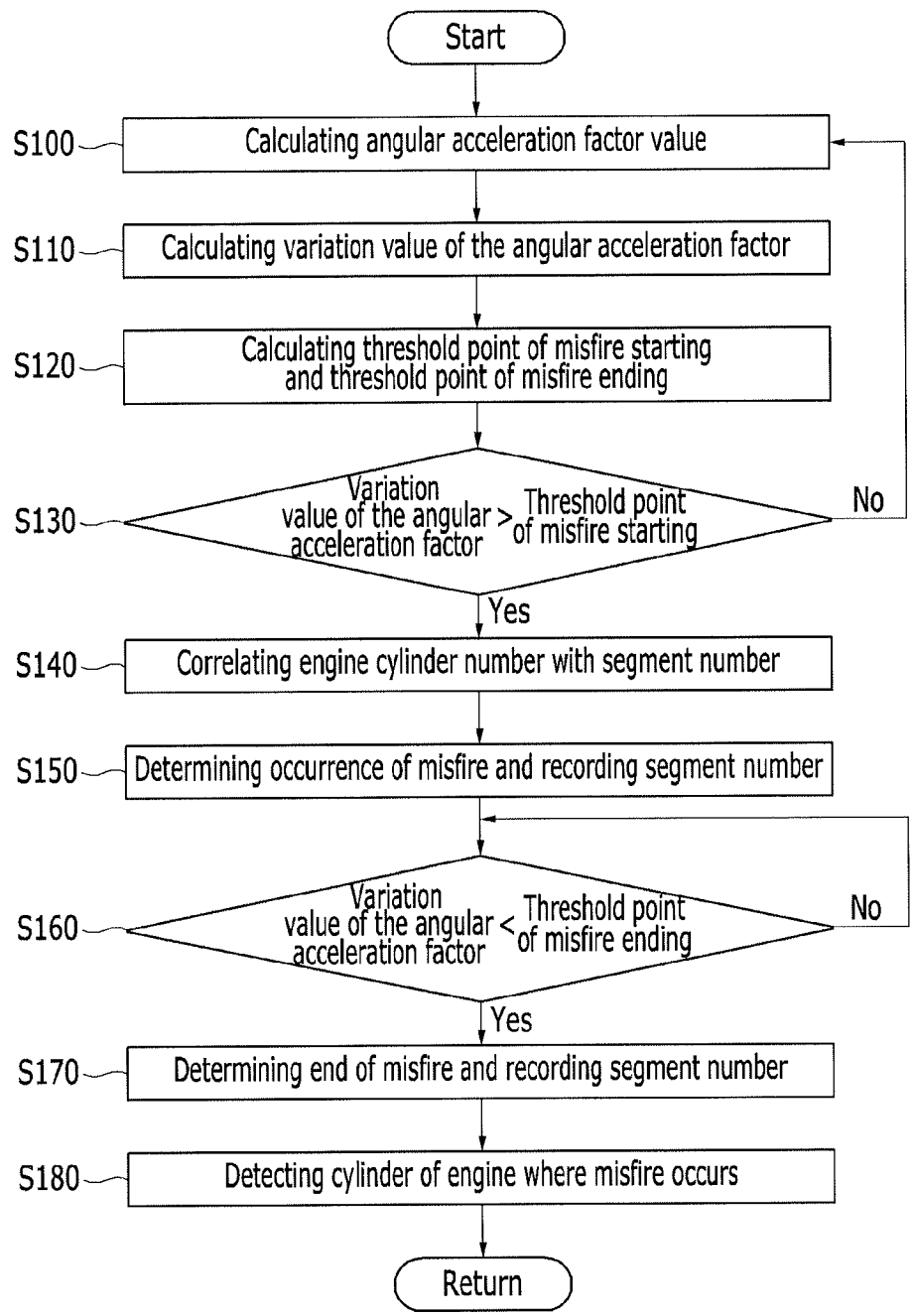
FIG. 2 is a flowchart showing an exemplary method of detecting misfire of an engine according to the present invention.

Hereinafter, a method of detecting misfire of the engine will be described in detail with reference to FIG. 2. FIG. 2 is a flowchart showing a method of detecting misfire of an engine according to various embodiments of the present invention.

First, the controlling unit 200 detects the required time to explosion stroke of each engine cylinder depending on an engine speed, and calculates the angular acceleration of a crankshaft. After that, the controlling unit 200 calculates an angular acceleration factor value by considering the required time to the explosion stroke of each engine cylinder and an average variation of the engine speed at step S100.

Here, the angular acceleration factor value represents a ratio of a rotation time of during the explosion stroke of the present engine cylinder to a rotation time of during the explosion stroke of the previous engine cylinder. For example, the angular acceleration factor value is determined as in the following equation.

$$luts(n) = \frac{tsk(n+1) - tsk(n) - tkomp(n)}{tsk(n)^3}$$

In the equation, "luts" denotes the angular acceleration factor value, "tsk" denotes the rotation time during the explosion stroke of the engine cylinder, and "tkomp" denotes dynamic compensation.

A segment time which represents the required time to the explosion stroke of the engine cylinder may be measured by a crankshaft position sensor by sensing the phase of the crankshaft, and the measured segment time is stored in the ECU.

After that, the controlling unit 200 calculates a variation value of the angular acceleration factor at step S110 by using a differential equation and the angular acceleration factor value.

A normal operation stroke of the engine cylinder has a constant range of angular acceleration, while on the other hand, if a misfire occurs in the engine cylinder, output torque will be deteriorated and the angular acceleration will be changed over the constant range. Therefore, the variation value of the angular acceleration factor is used for determining misfire occurrence.

If the controlling unit 200 calculates the variation value of the angular acceleration factor, the controlling unit 200 calculates the threshold point of misfire starting and the threshold point of misfire ending at step S120.

The threshold point of misfire starting and the threshold point of misfire ending are determined by the engine speed detected by the engine speed detecting unit 110 and a running state of the vehicle according to the fuel injection amount detected by the fuel injection amount detecting unit 120. The threshold point of misfire starting and the threshold point of misfire ending are corrected by receiving variable data depending on the running state of the vehicle from the running state detecting unit 100, which includes the coolant temperature detecting unit 130, the combustion mode detecting unit 140, the starting condition detecting unit 150, and the clutch operation detecting unit 160. Therefore, the threshold point of misfire starting and the threshold point of misfire ending are determined more correctly.

If the variation value of the angular acceleration factor is calculated at step S110 and the threshold point of misfire starting and the threshold point of misfire ending are calculated at step S120, the misfire determining unit 220 compares the variation value of the angular acceleration factor with the threshold point of misfire starting at step S130.

The misfire determining unit 220 compares the variation value of the angular acceleration factor with the threshold point of misfire starting, and the process proceeds to step S140 if the variation value of the angular acceleration factor is greater than the threshold point of misfire starting. On the other hand, if the variation value of the angular acceleration factor is lower than the threshold point of misfire starting, the process returns to step S100.

Figure 3:
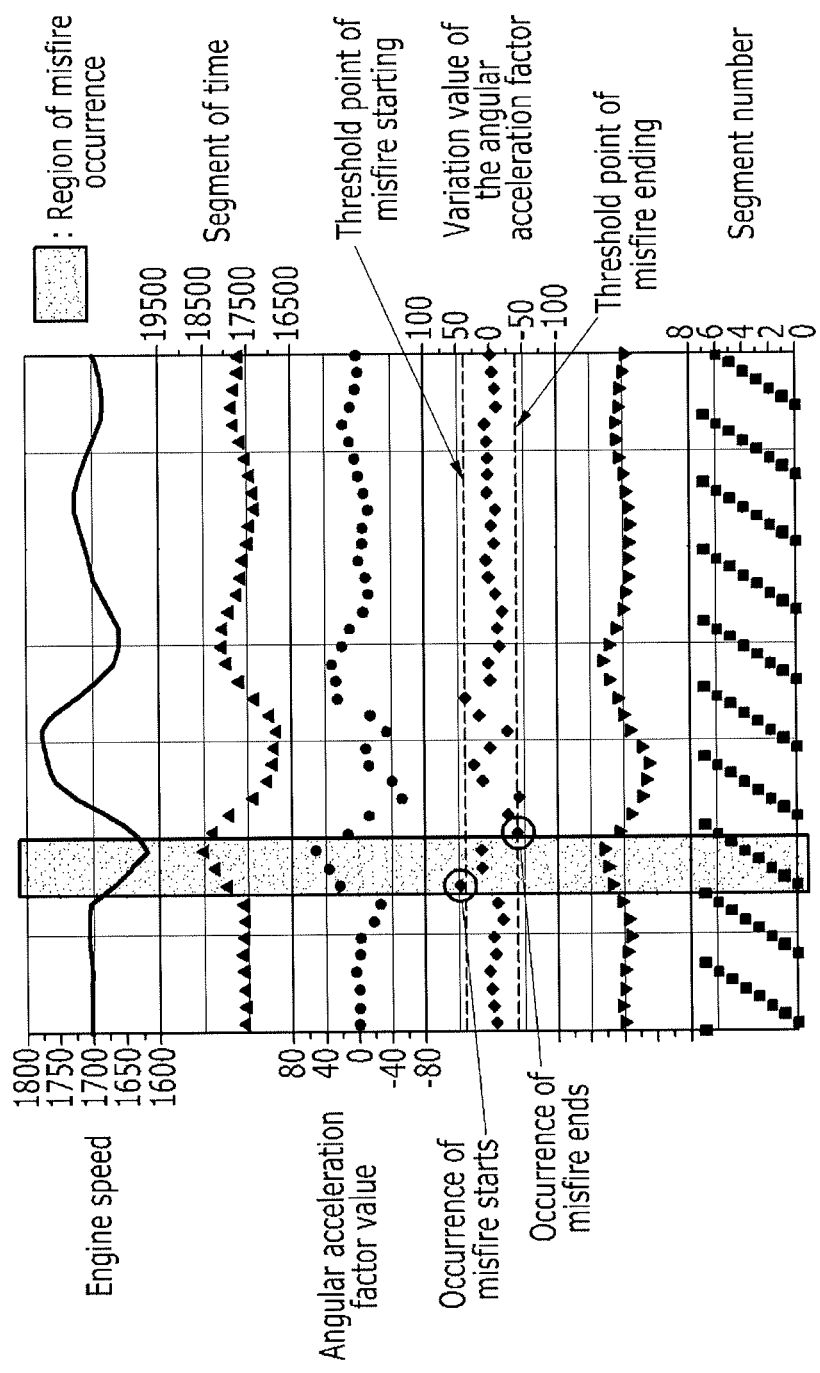
FIG. 3 is a drawing showing an exemplary process of detecting misfire of an engine according to the present invention.

Referring to FIG. 3 which is a drawing showing a process of detecting misfire of an engine according to various embodiments of the present, when the variation value of the angular acceleration factor is greater than the threshold point of misfire starting, misfire occurrence starts in the engine cylinder.

If the variation value of the angular acceleration factor is greater than the threshold point of misfire starting, the misfire determining unit 220 correlates the engine cylinder number stored in the ECU with a segment number of misfire occurrences in order to determine misfire occurrence of the engine cylinder at step S140.

After that, as shown in FIG. 3, the misfire determining unit 220 determines that misfire occurrence has started in the engine cylinder when the variation value of the angular acceleration factor is greater than the threshold point of misfire starting, and records the segment number correlated at step S140 in order to determine all of engine cylinders in which misfire occur at step S150.

After the steps proceeding from the step S130 to step S150, the misfire determining unit 220 compares the variation value of the angular acceleration factor with the threshold point of misfire ending in order to detect a time point of misfire ending at step S160.

If the variation value of the angular acceleration factor is greater than the threshold point of misfire ending, the step S160 is repeated, whereas if the variation value of the angular acceleration factor is lower than the threshold point of misfire ending, the process proceeds to step S170.

If the variation value of the angular acceleration factor is lower than the threshold point of misfire ending, the misfire determining unit 220 determines that misfire occurrence has ended in the engine cylinder, and records the segment number at step S170.

After that, the misfire determining unit 220 determines misfire occurrence of the engine cylinder by correlating the engine cylinder number stored in the ECU with the segment number recorded at step S150 and step S170 at step S180.

The misfire determining unit 220 determines that misfire occurs in all engine cylinders prior to the segment number of the engine cylinder where the misfire occurrence ends at step S170 from the segment number of the engine cylinder where the misfire occurrence starts at step S150.

For example, four cylinders from 1 to 4 in a four cylinder engine correspond to the segment numbers 2, 0, 4, and 6 when each engine cylinder finishes the explosion stroke. As shown in FIG. 3, the segment number which is 0 where the variation value of the angular acceleration factor is greater than the threshold point of misfire starting corresponds to the second cylinder, and the segment number which is 6 where the variation value of the angular acceleration factor is lower than the threshold point of misfire ending corresponds to the fourth cylinder. In this case, the misfire determining unit 220 determines that misfire continuously occurs in three engine cylinders that are second, first, and third engine cylinders because the engine cylinders perform the explosion stroke in order of the first, third, second, and fourth cylinders.

The method of detecting misfire of the engine according to an exemplary embodiment of the present invention may be applied with other traditional methods of detecting misfire in parallel, so that the method may precisely detect misfire occurrence when a misfire continuously occurs in three or more engine cylinders and may detect the engine cylinder where the misfire occurs.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope, of the invention be defined by the Claims appended hereto and their equivalents.

What is claimed is:

1. A method of detecting misfire of an engine for a vehicle, comprising:
    calculating an angular acceleration factor value on the basis of an engine speed;
    calculating a variation value of an angular acceleration factor on the basis of the angular acceleration factor value;
    calculating a threshold point of misfire starting and a threshold point of misfire ending;
    comparing the variation value of the angular acceleration factor with the threshold point of misfire starting;
    comparing the variation value of the angular acceleration factor with the threshold point of misfire ending; and
    detecting a cylinder of the engine where the misfire occurs by the comparison results of the variation value of the angular acceleration factor with the threshold point of misfire starting and the threshold point of misfire ending.

2. The method of claim 1, wherein the calculation of the angular acceleration factor value on the basis of the engine speed is performed by calculating an angular acceleration of a crank angle and considering a time per segment and an average variation of the engine speed.

3. The method of claim 1, wherein the comparison of the variation value of the angular acceleration factor with the threshold point of misfire starting comprises:
    correlating an engine cylinder number with a segment number when a corresponding engine cylinder finishes an explosion stroke; and
    determining occurrence of misfire and recording the segment number when the variation value of the angular acceleration factor is greater than the threshold point of misfire starting.

4. The method of claim 1, wherein the misfire is determined to end when the variation value of the angular acceleration factor is lower than the threshold point of misfire ending, and a segment number is recorded in the comparing of the variation value of the angular acceleration factor with the threshold point of misfire ending.

5. The method of claim 1, wherein in the detecting of a cylinder of the engine where the misfire occurs by the comparison results, the misfire is determined to occur in all the engine cylinders from an engine cylinder where the variation value of the angular acceleration factor is greater than the threshold point of misfire starting to an engine cylinder where the variation value of the angular acceleration factor is lower than the threshold point of misfire ending.

6. The method of claim 1, wherein the threshold point of misfire starting and the threshold point of misfire ending are determined by the engine speed and a running state of the vehicle according to a fuel injection amount.

7. The method of claim 6, wherein the threshold point of misfire starting and the threshold point of misfire ending are corrected by receiving a coolant temperature, a combustion mode, a starting condition, and a clutch operation.

8. An apparatus for detecting misfire of an engine for a vehicle, comprising:
    a running state detecting unit configured to recognize a running state of the vehicle;
    a threshold point calculating unit configured to calculate a threshold point of misfire starting and a threshold point of misfire ending;
    a misfire determining unit configured to determine a misfire on the basis of signals output from the running state detecting unit and the threshold point calculating unit; and
    a displaying unit configured to display a misfire occurrence of an engine cylinder to a driver,
    wherein the running state detecting unit comprises:
        an engine speed detecting unit configured to detect an engine speed;
        a fuel injection amount detecting unit configured to measure an amount of fuel injected into an engine cylinder;
        a coolant temperature detecting unit configured to measure a coolant temperature;
        a combustion mode detecting unit configured to detect a predetermined combustion mode;
        a starting condition detecting unit configured to detect a starting condition; and
        a clutch operation detecting unit configured to detect a clutch operation.

9. The apparatus of claim 8, wherein the threshold point calculating unit corrects a threshold point depending on the running state of the vehicle detected from the running state detecting unit.

10. The apparatus of claim 8, wherein the misfire determining unit determines the misfire occurrence of the engine cylinder by comparing a variation value of an angular acceleration factor with a threshold point calculated by the threshold point calculating unit.

11. The apparatus of claim 10, wherein the misfire determining unit determines that misfire occurs when the variation value of the angular acceleration factor is greater than the threshold point of misfire starting, and that misfire ends when the variation value of the angular acceleration factor is lower than the threshold point of misfire ending.

12. The apparatus of claim 11, wherein the misfire determining unit determines that misfire occurs in all the engine cylinders from an engine cylinder which performs an explosion stroke at a time of misfire starting to an engine cylinder which performs the explosion stroke just before a time of misfire ending.

13. An apparatus for detecting misfire of an engine for a vehicle, comprising:
 a running state detecting unit configured to recognize a running state of the vehicle;
 a threshold point calculating unit configured to calculate a threshold point of misfire starting and a threshold point of misfire ending;
 a misfire determining unit configured to determine a misfire on the basis of signals output from the running state detecting unit and the threshold point calculating unit; and
 a displaying unit configured to display a misfire occurrence of an engine cylinder to a driver,
 wherein the misfire determining unit determines the misfire occurrence of the engine cylinder by comparing a variation value of an angular acceleration factor with a threshold point calculated by the threshold point calculating unit, and
 wherein the misfire determining unit determines that misfire occurs when the variation value of the angular acceleration factor is greater than the threshold point of misfire starting, and that misfire ends when the variation value of the angular acceleration factor is lower than the threshold point of misfire ending.

14. The apparatus of claim 13, wherein the misfire determining unit determines that misfire occurs in all the engine cylinders from an engine cylinder which performs an explosion stroke at a time of misfire starting to an engine cylinder which performs the explosion stroke just before a time of misfire ending.

* * * * *